United States Patent [19]

Packer

[11] Patent Number: 5,157,856
[45] Date of Patent: Oct. 27, 1992

[54] LURE RETRIEVER

[76] Inventor: Raymond A. Packer, P.O. Box 924, Johnstown, Pa. 15907

[21] Appl. No.: 684,800

[22] Filed: Apr. 15, 1991

[51] Int. Cl.$^5$ .............................................. A01K 97/00
[52] U.S. Cl. .................................................. 43/17.2
[58] Field of Search ........................... 43/17.2, 44.9, 4

[56] References Cited

U.S. PATENT DOCUMENTS

| | | | |
|---|---|---|---|
| 2,481,975 | 9/1949 | Brooks | 43/17.2 |
| 2,526,031 | 10/1950 | Kocarek | 43/17.2 |
| 2,534,790 | 12/1950 | Moore | 43/17.2 |
| 2,926,449 | 3/1960 | Rupert | 43/17.2 |
| 3,364,611 | 1/1968 | Downing | 43/17.2 |
| 3,623,258 | 11/1971 | Doane | 43/17.2 |
| 3,772,815 | 11/1973 | Burgess | 43/17.2 |
| 4,467,547 | 8/1984 | Chabot | 43/17.2 |

FOREIGN PATENT DOCUMENTS 1128638  9/1968  United Kingdom ................ 43/17.2

Primary Examiner—Richard K. Seidel
Assistant Examiner—Chuck Y. Mah

[57] ABSTRACT

The disclosure describes a device which enables the retrieval of fishing lures from entanglement with submerged objects. It is a ringed device with a fissure located at a right angle from an aperture to which a twine is attached. This fissure allows attachment of the device to the fishing line, yet is constructed to prevent inadvertent disengagement with the fishing line. The device, at the aperture, is attached to a twine which is held on the water surface. The device descends the fishing line to the lure by attachment at the fissure. Upon engagement with the lure, the device is pulled from the water surface by the twine, thus effecting the lure retrieval.

1 Claim, 1 Drawing Sheet

LURE RETRIEVER

BACKGROUND OF THE INVENTION

The present invention is generally related to a device for retrieving fishing lures which become snagged upon immovable objects beneath the water surface. More particularly it is concerned with a device which will remove the lure from many different immovable objects without damage to the lure body, severance of the lure's filament, or entanglement with the submerged objects.

At the present time the retrieval of fishing lures, which have become snagged upon objects beneath the water surface, is effected through pulling and releasing in rapid succession, the apparatus to which the lure is attached, by a filament. On many occasions, this results in overstressed to severed line and a forfeited lure. One device to release snagged lures from submerged objects, is a weighted apparatus lowered down the filament, which strikes the lure to free it from the object. This can result in damage to the lure body. A further device utilizes hooks attached to a metal object which, when lowered down the filament, affix to the lure's hooks to retrieve it. These hooks, however, may also become entangled on the immovable object, and when freed through force, may catch and sever the lure's filament or damage the lure body.

U.S. Pat. No. 3,623,258 dated Nov. 30, 1971, inventor Harold R. Doane, describes a device for retrieving lures which is stretched over rod and reel to reach the lure. It then dislodges the lure through force by weight.

U.S. Pat. No. 4,467,547 dated Aug. 28, 1984, inventor Louis Chabot, describes a device for retrieving a fishing lure which is lowered down the fishing line to remove the snagged lure. This device has an arrangement of prongs and movable parts used to engage the obstruction and fishing line.

It will be realized that the above mentioned devices are functionally cumbersome. They hold the propensity to damage the lure body or line filament, risking forfeiture of the lure.

To overcome the shortcomings of the existing devices, the present invention was developed to provide a quick and effective means for retrieving snagged lures under broad circumstances. This new invention lacks protrusions, prongs, appendages, sharp objects and added weight, thus radically decreasing the probability of any adverse effects to the lure filament or body. Likewise, this device can not easily become entangled upon the submerged object to which the lure is snagged. This device is also small, compact and easily transportable without entanglement with other fishing equipment.

SUMMARY OF THE INVENTION

It is the object of the current invention to afford a device which allows the retrieval of a fishing lure from the submerged obstacle to which it is snagged without damage to the lure body, severance of the lure filament, or entanglement with the obstacle from which the lure needs retrieved.

This object can be accomplished through the use of a ringed member with a means to quickly reach the snagged fishing lure and a means to bring the device and lure to the water surface.

BRIEF DESCRIPTION OF THE DRAWINGS

The following drawings will provide an illustration of the invention.

DETAILED DESCRIPTION OF THE DRAWINGS

Figure 1:
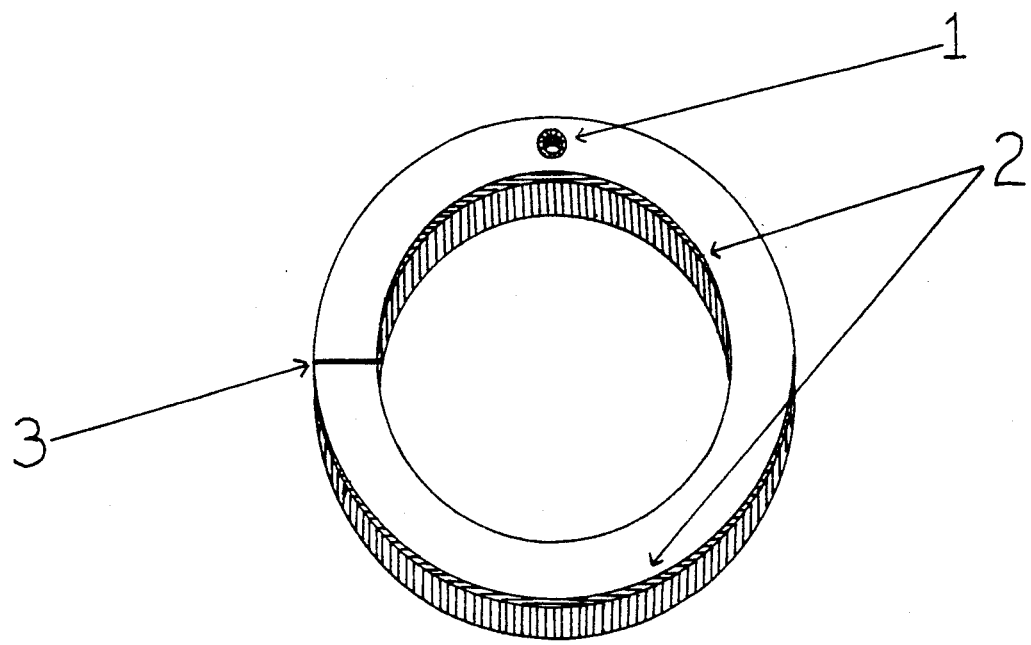
FIG. 1 is a view of the device lying on a horizontal plane.
Figure 2:
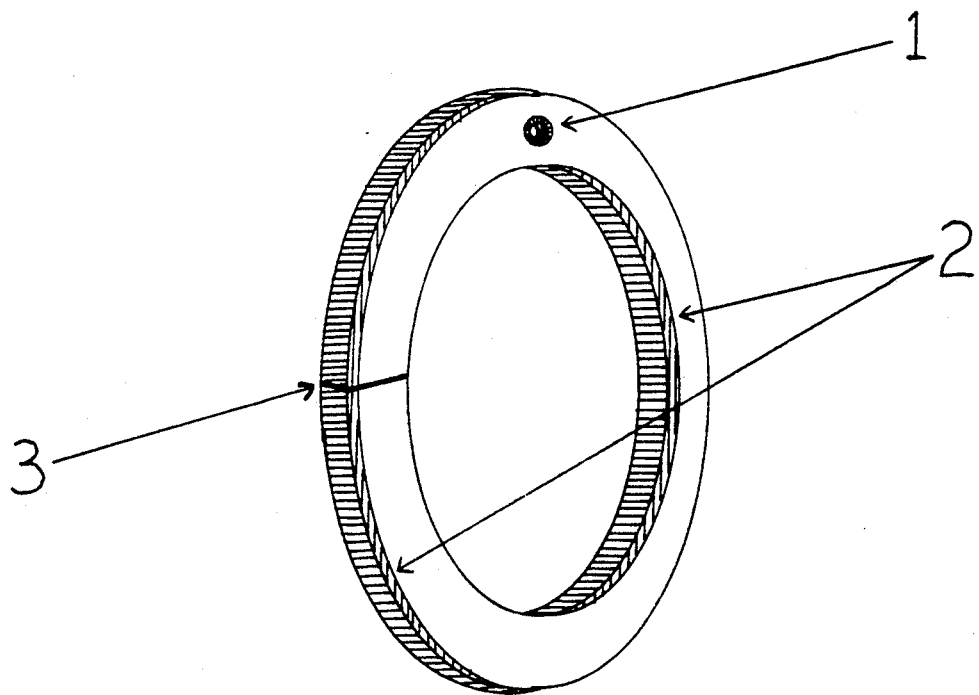
FIG. 2 is a perspective view of the device in a perpendicular position to the horizontal plane.

In accordance with the invention, a device for retrieving lures compromises a ringed member of solid, metallic manufacture. The device is of sufficient thickness and diameter to permit a rapid but not excessive descent. The thickness and diameter are such that there is sufficient weight to carry the device down the lure filament to the snagged lure, but not damage it. The device is not so large as to inhibit its attachment to the lure when effecting the retrieval.

The device has an aperture 1, midway between the inside and outside diameter, passing through the device. The object of the aperture is to provide a means to attach a twine for the purpose of linking the submerged device with the water surface. There is a chamfer on the device twine's aperture 1, to prevent fraying or severance of the twine. This twine is to be of sufficient tensile strength to prevent breaking during the stress created while extracting the lure by pulling said twine from the water surface.

At a point 90 degrees (± standard tolerances) from the hole, there is a fissure 3 through the wall of the device. The object of said fissure is to provide a rapid means to engage the device to the filament attached to the lure. Time is of the essence when retrieving a lure due to wind and water currents, and the tensile strength of the lure filament. The device attaches to the lure filament through said fissure, then descends the lure filament, engages the lure, and finally retrieves the lure when the device cord is pulled from the water surface. The fissure 3 is of such a diameter as to prevent device disengagement from the filament attached to the lure.

A chamfer 2, is cut on the inside and outside edges of the device. The object of said chamfer is to prevent severance of the filament attached to the lure while retrieving said lure.

The surface of the device exhibits two vital objects. Said surface is smooth and lacks projecting parts. These objects prevent severing the lure filament by eliminating elements to which said filament could ensnare, or cause device entanglement.

I claim:
1. A device for a retrieval of fishing lures which becomes snagged upon various submerged, immovable objects, said device consisting of:
   a solid metallic ringed member having an outside diameter, and an inside diameter enabling passage over a lure body;
   a chamfer on the inside and outside diameters to prevent a frayed or severed fishing line;
   an aperture passing through said member midway between the inside and outside diameters for attaching a twine to control said member from a water surface;
   a fissure located at the ringed member 90 degrees from said aperture to permit passage of a fishing line filament, said fissure having a fine diameter such that to prevent disengagement of the member from the fishing line filament.

* * * * *